(12) United States Patent
Mohtadi

(10) Patent No.: US 7,914,846 B2
(45) Date of Patent: Mar. 29, 2011

(54) METHOD FOR ENCAPSULATING REACTIVE METAL HYDRIDES

(75) Inventor: Rana F. Mohtadi, Northville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 351 days.

(21) Appl. No.: 12/105,035

(22) Filed: Apr. 17, 2008

(65) Prior Publication Data

US 2009/0264272 A1    Oct. 22, 2009

(51) Int. Cl.
*B05D 7/00*    (2006.01)
(52) U.S. Cl. .................. 427/212; 427/213.31; 423/657; 420/900
(58) Field of Classification Search .................. 427/212, 427/213.31; 423/657; 420/900
See application file for complete search history.

(56) References Cited

U.S. PATENT DOCUMENTS

| | | | | |
|---|---|---|---|---|
| 3,376,173 | A * | 4/1968 | Carley et al. ............. | 149/5 |
| 4,257,798 | A | 3/1981 | Hendricks et al. | |
| 5,630,933 | A * | 5/1997 | Law et al. ............. | 205/704 |
| 7,169,489 | B2 * | 1/2007 | Redmond ................ | 429/12 |
| 7,186,474 | B2 * | 3/2007 | Jang ................ | 429/17 |
| 7,279,222 | B2 * | 10/2007 | Hearley et al. ........ | 428/403 |
| 2004/0213998 | A1 | 10/2004 | Hearley et al. | |
| 2006/0060820 | A1 | 3/2006 | Schumacher et al. | |
| 2006/0063003 | A1 | 3/2006 | Yang et al. | |
| 2006/0257314 | A1 * | 11/2006 | Natarajan ............. | 423/657 |
| 2006/0264324 | A1 * | 11/2006 | Schuth et al. ............ | 502/400 |
| 2009/0113795 | A1 * | 5/2009 | Eickhoff ................ | 48/116 |

FOREIGN PATENT DOCUMENTS

| | | |
|---|---|---|
| JP | 58223606 | 12/1983 |
| WO | WO 2004/065292 * | 8/2004 |
| WO | WO-2007/011381 | 1/2007 |

OTHER PUBLICATIONS

Heung, L.K., "Separation using encapsulated metal hydride". Proceedings of the 2001 DOE Hydrogen Program Review, pp. 1-7.*
Boss, Sally R., et al., "Hydride encapsulation by a molecular main-group-metal cluster: single-crystal neutron diffraction of [{Ph(2-C5H4N)N}6HLi8]+". Organometallics, vol. 23, No. 20, Sep. 2004, pp. 4527-4530.*
Nishimiya, Nobuyuki, et al., "Water resistant hydrogen storage materials comprising encapsulated metal hydrides". International Journal of Hydrogen Energy 32 (2007) pp. 661-665.*

* cited by examiner

*Primary Examiner* — Bret Chen
(74) *Attorney, Agent, or Firm* — Gifford, Krass, Sprinkle, Anderson & Citkowski, P.C.

(57) ABSTRACT

A process for encapsulating a metal hydride within a hollow glass sphere is provided. The process includes providing a hollow glass sphere, the hollow glass sphere having a shell enclosing an inner volume. The hollow glass sphere is placed within an enclosed chamber and the chamber is evacuated such that a negative pressure is present therewithin. The hollow glass sphere within the evacuated enclosed chamber is subjected to an external element such that the shell affords for molecules to diffuse therethrough. In some instances, the external element is heat, infrared light and combinations thereof. Thereafter, a metal hydride is provided in the form of a vapor and the evacuated enclosed chamber with the hollow glass sphere is exposed to metal hydride vapor and molecules of the metal hydride diffuse through the shell into the inner volume. Thereafter, the external element is removed from the hollow glass sphere such that diffusion of molecules through the shell is generally prohibited and the metal hydride within the hollow glass sphere is in a dense state.

16 Claims, 1 Drawing Sheet

METHOD FOR ENCAPSULATING REACTIVE METAL HYDRIDES

FIELD OF THE INVENTION

This invention relates generally to a method for encapsulating a material. More specifically, the invention relates to a method for encapsulating a reactive metal hydride.

BACKGROUND OF THE INVENTION

The use of hydrogen as an energy source is attractive since its electrochemical oxidation reaction in a Proton Exchange Membrane (PEM) fuel cell results only in water vapor and no greenhouse gases such as carbon monoxide, carbon dioxide and the like are emitted into the atmosphere. However, the storage of hydrogen has presented technological difficulties since hydrogen is a light gas and has an extremely low condensation temperature that affords for the storage of hydrogen as a liquid. As such, the energy required to store hydrogen in its liquid form exceeds the benefits of using hydrogen as an energy source and hydrogen is typically stored in its gaseous form under pressures from 5,000 to 10,000 pounds per square inch. This type of storage system is not efficient on a volumetric level and is of concern with respect to failure of the storage container.

One of the most promising hydrogen storage methods is the storage of hydrogen in a solid state within complex metal hydrides such as alanates or borohydrides. In fact, these materials have hydrogen densities at least 1.5 times greater than liquid hydrogen. For example, alumino borane has a hydrogen volumetric density of 132 $kg/m^3$. As such, current research efforts have focused on enhancing the thermal hydrogen storage properties of complex metal hydrides such as alkaline, alkaline earth, and transition metal based alanates or borohydrides. However, the safety of storing these materials on vehicles has received little attention. For example, protection of unstable complex metal hydrides, such as covalently bonded tetraalanate or tetrahydroborate, both of which possess excellent hydrogen storage capabilities, has not been reported. These materials are known for being air and moisture sensitive and typically require handling within a well-controlled glove box environment. Protection of complex metal hydrides such as sodium alanate $NaAlH_4$ and lithium borohydride $LiBH_4$ by encapsulation in porous walled silica based hollow glass has been previously reported. The encapsulation was conducted by a material solution diffusing through pores within walls of the silica glass spheres ranging in size from 100 to few thousands of Angstroms. Although not illustrated, the walls were said to be sealed by coating the outer surface of the spheres following the encapsulation. Limited solubility of most hydrides in solvents, and the need to seal the wall pores make protection by diffusion through porous silica walls a complicated and inefficient process. Therefore, an alternate method for protecting reactive metal hydrides such that the need for porous wall formation, solvent utilization, and wall coating after encapsulation are eliminated—thus achieving an efficient and simplified encapsulation process—would be desirable.

SUMMARY OF THE INVENTION

A process for encapsulating a metal hydride within a hollow glass sphere is provided. The process includes providing a hollow glass sphere, the hollow glass sphere having a shell enclosing an inner volume. The hollow glass sphere is placed within an enclosed chamber and the chamber is evacuated such that a negative pressure is present therewithin. The hollow glass sphere within the evacuated enclosed chamber is subjected to an external element such that the shell affords for molecules to diffuse therethrough. In some instances, the external element is heat, infrared light and combinations thereof. Thereafter, a metal hydride is provided in the form of a vapor and the evacuated enclosed chamber with the hollow glass sphere is exposed to metal hydride vapor and molecules of the metal hydride diffuse through the shell into the inner volume. Thereafter, the external element is removed from the hollow glass sphere such that diffusion of molecules through the shell is generally prohibited and the metal hydride within the hollow glass sphere is in a dense state.

DETAILED DESCRIPTION OF THE PRESENT INVENTION

The present invention discloses a process for encapsulating a metal hydride within a hollow glass sphere. As such, the process has utility as a method for the safe and efficient storage of a hydrogen storage material.

The process includes providing a hollow glass sphere, the hollow glass sphere having a shell enclosing an inner volume and walls doped with metal oxides. The hollow glass sphere is placed into an enclosed chamber, such as a vacuum chamber, with the enclosed chamber evacuated until a negative pressure is present therewithin. The hollow glass sphere within the enclosed chamber is exposed to an external element such that the shell affords for diffusion of molecules therethrough. It is appreciated that with the enclosed chamber under a negative pressure, gaseous molecules within the hollow glass sphere will seek to diffuse out of the inner volume to the surrounding enclosed chamber. In this manner, a negative pressure is provided within the hollow glass sphere.

The process also includes providing a metal hydride in the form of a vapor, and then exposing the evacuated enclosed chamber to the metal hydride vapor. The metal hydride could be in a vapor state at room temperature, or could be a volatile liquid with a high vapor pressure at room temperature. The metal hydride vapor in the enclosed chamber diffuses through the shell of the hollow glass sphere and into the inner volume. After metal hydride vapor has diffused into the inner volume of the hollow glass sphere, the external element is removed from the hollow glass sphere such that diffusion of molecules through the shell is generally prohibited and the metal hydride vapor condenses into a condensed state.

Figure 1:
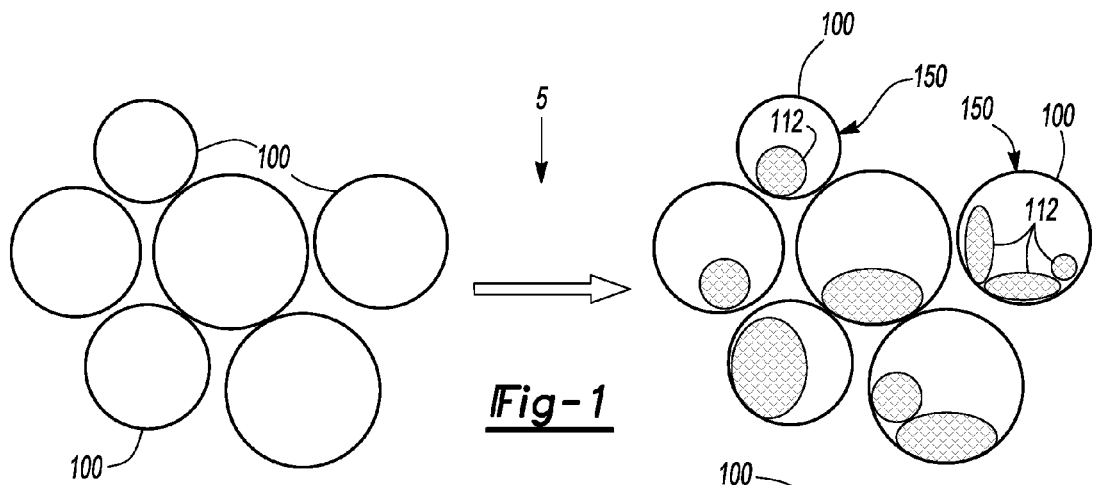
FIG. 1 is a schematic diagram illustrating an embodiment of the present invention.

Turning now to FIG. 1, an embodiment of the present invention is shown generally at reference numeral 5. The embodiment 5 includes providing a hollow glass sphere 100 and processing the sphere 100 such that an encapsulated particle 150 is provided wherein the particle 150 includes the hollow glass sphere 100 with a condensed metal hydride 112 therewithin.

Figure 2:
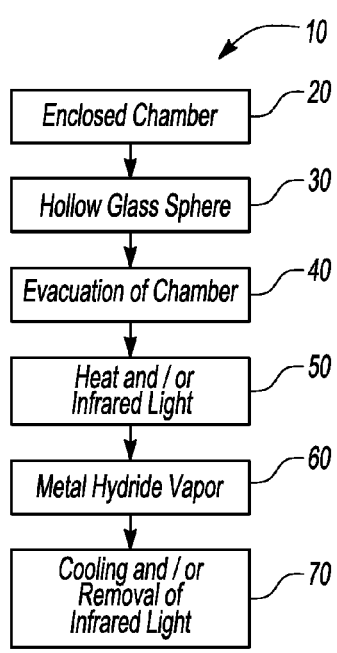
FIG. 2 is a schematic flowchart illustrating an embodiment of the present invention.

A schematic flowchart illustrating another embodiment of the present invention is shown generally at reference numeral 10 in FIG. 2. This embodiment includes providing an enclosed chamber at step 20. The enclosed chamber can be any chamber wherein a vacuum can be pulled thereon and is typically known as a vacuum chamber. A hollow glass sphere is placed within the enclosed chamber at step 30. It is appreciated that a plurality of hollow glass spheres can be placed within the vacuum chamber, the hollow glass spheres made from any glass that is suitable for the diffusion of molecules therethrough when an external element such as heat and/or infrared light is applied thereto. In some instances, the hollow glass sphere can be made from a silica based glass. In other instances, the hollow glass sphere will be made from metal doped silica based types of glasses.

After the hollow glass sphere has been placed within the enclosed chamber, the chamber is evacuated at step 40 such that a negative pressure is present therewithin. The negative pressure can be a vacuum between $10^{-3}$ and $10^{-7}$ torr. After the enclosed chamber has been evacuated, or in the alternative while the enclosed chamber is being evacuated, an external element is applied to the hollow glass sphere at step 50. As shown in FIG. 2, the external element can include the application of heat and/or infrared light upon the hollow glass sphere. In some instances, the application of heat to the hollow glass sphere results in the temperature of the sphere being between 0 and 600° C. It is appreciated that the exposure of the hollow glass sphere to the external element affords for the diffusion of molecules through a shell of the hollow glass sphere. In addition, it is appreciated that by evacuating the enclosed chamber at step 40, a pressure differential will be provided between the inner volume of the hollow glass sphere and the enclosed chamber surrounding the hollow glass sphere. As such, when the external element is provided at step 50, thereby enhancing diffusion through the shell, the pressure differential provides a driving force wherein gas molecules within the inner volume of the hollow glass sphere will diffuse through the shell and out into the enclosed chamber surrounding the sphere. In this manner, a negative pressure is present within the hollow glass sphere.

At step 60, a metal hydride is provided in the form of a vapor. In some instances, the metal hydride vapor can be provided by heating a metal hydride that is in a condensed state. The metal hydride vapor is allowed to enter the evacuated enclosed chamber, thereby resulting in an increase in pressure therewithin. With the increase in pressure within the evacuated chamber, a pressure differential is provided wherein the pressure of the metal hydride vapor is greater outside of the hollow glass sphere than the pressure inside the hollow glass sphere, thus resulting in vapor diffusion through the shell of the hollow glass sphere into the inner volume thereof.

At some predetermined time, the external element is removed from the hollow glass sphere at step 70. As illustrated in FIG. 2, this can take the form of cooling the hollow glass sphere and/or removal of the infrared light. The removal of the external element from the hollow glass sphere affords for the metal hydride vapor within the sphere to condense to a condensed state.

Figure 3:
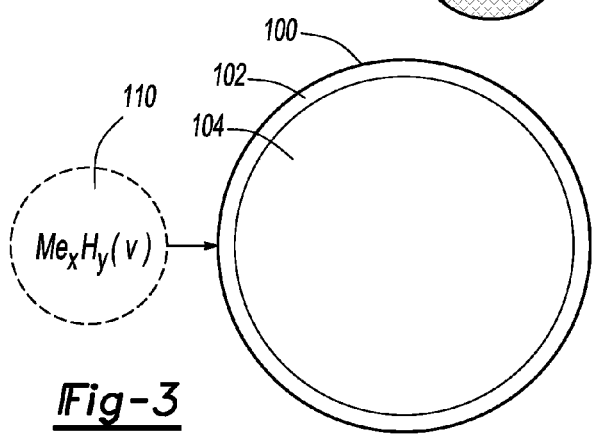
FIG. 3 illustrates a hollow glass sphere before being infused with a metal hydride vapor.
Figure 4:
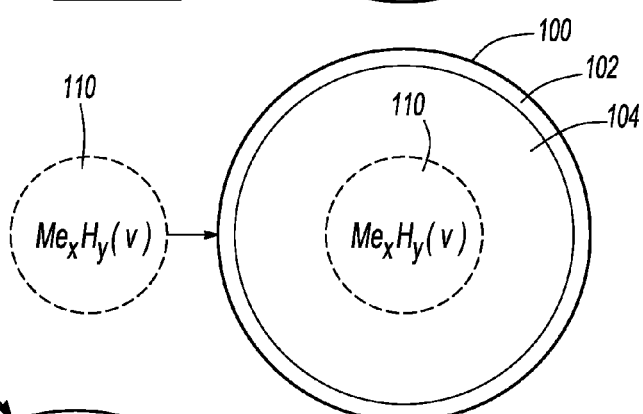
FIG. 4 illustrates a hollow glass sphere after being infused with a metal hydride vapor.
Figure 5:
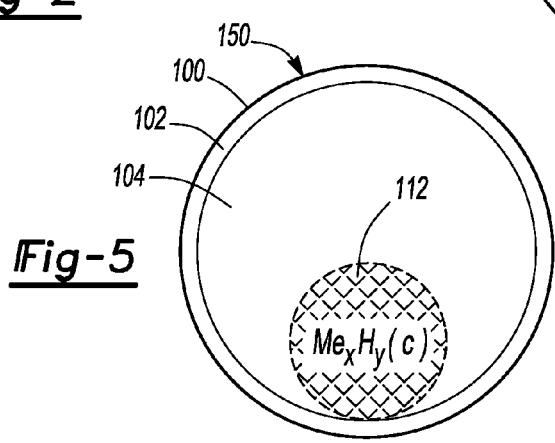
FIG. 5 illustrates a hollow glass sphere wherein the metal hydride is in a condensed state.

Looking now at FIGS. 3-5, an illustrative example is provided for the formation of an encapsulated metal hydride. Starting with FIG. 3, a hollow glass sphere 100 can have a shell 102 and an inner volume 104. After the hollow glass sphere 100 has been placed within an enclosed chamber and the chamber has been evacuated, a metal hydride vapor 110 is provided. FIG. 3 illustrates the hollow glass sphere after the interior has been evacuated by diffusion of gas molecules that were within the inner volume 104 have diffused outwardly into the enclosed chamber, but before the metal hydride vapor 110 has diffused into the inner volume 104.

After the metal hydride vapor 110 is provided to the enclosed chamber, the pressure differential that is present between the exterior of the hollow glass sphere 100 and the inner volume 104 results in the diffusion of metal hydride molecules through the shell 102 into the inner volume 104 as illustrated in FIG. 4. It is appreciated that metal hydride molecules on the outer surface of the shell 102 may dissociate into different species, separately diffuse through the shell 102 and recombine to form the metal hydride vapor on the inner surface of the shell 102 by applying hydrogen gas pressure. At some predetermined time, the external element that afforded for enhanced diffusion of molecules through the shell 102 of the hollow glass sphere 100 is removed and the metal hydride vapor 110 condenses to a condensed state 112 as shown in FIG. 5. In this manner, a hollow glass sphere 100 having a condensed metal hydride 112 therewithin is provided. In some instances, the hollow glass sphere 100 has an average mean diameter between 1 micron and 1 millimeter. In other instances, the hollow glass sphere 100 has an average mean diameter between 5 and 500 microns. In yet other instances, the hollow glass sphere 100 has an average mean diameter between 10 and 100 microns. It is appreciated that the shell 102 has a thickness. The thickness can be between 0.1 to 5 microns, and in some instances is between 0.1 to 1 micron.

After the external element has been removed from the hollow glass sphere 100, the condensed complex metal hydride 112 occupies up to 50% of the inner volume 104 within the hollow glass sphere 100 and in other instances, the condensed metal hydride 112 occupies generally all of the inner volume 104 within the hollow glass sphere 100.

It is appreciated that the heat that may be provided to the hollow glass sphere 100 can be supplied by resistance heating, radiant heating, induction heating and the like. In addition, the infrared light can be provided by an infrared light source which is energized when so desired and de-energized when the external element is to be removed from the hollow glass sphere.

The foregoing drawings, discussion and description are illustrative of specific embodiments of the present invention, but they are not meant to be limitations upon the practice thereof. Numerous modifications and variations of the invention will be readily apparent to those of skill in the art in view of the teaching presented herein. It is the following claims, including all equivalents, which define the scope of the invention.

I claim:

1. A process for encapsulating a metal hydride within a hollow glass sphere, the method comprising:
   providing a hollow glass sphere, the hollow glass sphere having a shell enclosing an inner volume;
   placing the hollow gas sphere into an enclosed chamber;
   evacuating the enclosed chamber such that a negative pressure is present within the enclosed chamber;
   exposing the hollow glass sphere within the enclosed chamber to an external element such that the shell will allow molecules to diffuse therethrough;
   providing a metal hydride in the form of a vapor;
   exposing the evacuated enclosed chamber to the metal hydride vapor;
   removing the external element from the hollow glass sphere such that diffusion of the metal hydride molecules through the shell of the hollow glass sphere is generally prohibited and any metal hydride within the hollow glass sphere is in a condensed state.

2. The process of claim 1, wherein the hollow glass sphere is made from metal doped silica based glass.

3. The process of claim 2, wherein the hollow glass sphere has an average mean diameter between 1 micron and 1 millimeter.

4. The process of claim 3, wherein the hollow glass sphere has an average mean diameter between 5 and 500 microns.

5. The process of claim 4, wherein the hollow glass sphere has an average mean diameter between 10 microns and 100 microns.

6. The process of claim 2, wherein the shell has a thickness between 0.1 to 5 microns.

7. The process of claim 6, wherein the shell has a thickness between 0.1 to 1 microns.

8. The process of claim 1, wherein the negative pressure within the enclosed chamber is a vacuum between $10^{-3}$ and $10^{-7}$ torr.

9. The process of claim 1, wherein the external element is selected from the group consisting of heat, infrared photons and combinations thereof.

10. The process of claim 9, wherein the hollow glass sphere is exposed to temperatures between 50 and 600° C.

11. The process of claim 10, wherein the hollow glass sphere is exposed to temperatures between 300 and 600° C.

12. The process of claim 1, wherein the hollow glass sphere is exposed to the metal hydride vapor a predetermined amount of time.

13. The process of claim 1, wherein the condensed metal hydride occupies up to 10% of the inner volume within the hollow glass sphere.

14. The process of claim 1, wherein the condensed metal hydride occupies generally all of the inner volume within the hollow glass sphere.

15. The process of claim 1, wherein the vapor of the metal hydride is provided by heating a condensed metal hydride.

16. A process for encapsulating a metal hydride within a hollow glass sphere, the method comprising:
   providing a plurality of hollow glass spheres, the hollow glass spheres each having a shell enclosing an inner volume;
   providing a metal hydride in a condensed state;
   placing the hollow gas spheres into a vacuum chamber;
   pulling a vacuum of between $10^{-3}$ and $10^{-7}$ torr on the vacuum chamber;
   heating the hollow glass spheres within the vacuum chamber to a temperature of between 50 and 600° C.;
   illuminating the hollow glass spheres with an energized infrared light source;
   heating the condensed metal hydride to form of a metal hydride vapor;
   exposing the hollow glass spheres to the metal hydride vapor for a predetermined amount of time;
   cooling the hollow glass spheres that have been exposed to the metal hydride vapor to a temperature below a condensation temperature for the metal hydride; and
   de-energizing the infrared light source.

* * * * *